United States Patent Office 2,907,721
Patented Oct. 6, 1959

2,907,721

CLEAR AND PIGMENTED OIL-IN-WATER RESIN EMULSIONS CONTAINING PENTAERYTHRITOL ALKYD RESINS

László Auer, South Orange, N.J., assignor to J. R. Geigy, S.A., Basel, Switzerland, a corporation of Switzerland No Drawing. Application June 14, 1954
Serial No. 436,692

15 Claims. (Cl. 260—7.5)

GENERAL OUTLINE OF INVENTION

The general drawback of pigment printing colors on textiles is their crocking. Crocking is marking off by abrasion to an unprinted and not dyed portion of the fabric, or to fabric in general. The crocking of pigment colors is their main drawback, which prevents increase in their use of coloring textiles. Also, the washability and dry cleaning resistance of pigment colored fabrices requires improvement, particularly if high temperatures of "curing" is to be avoided. Textile plants have low pressure steam available and for curing or thermosetting the amino-aldehyde resins (which are usual components of resin emulsion textile printing colors) temperatures of 275° to 300° F. are needed.

In present day textile printing with pigments, water-in-oil emulsions are used to a great extent in the trade, in spite of the fact that solvent cleaning of equipment is troublesome in textile plants.

Oil-in-water emulsions are easier to handle in textile plants than water-in-oil emulsions. They could be washed from the printing rollers, color boxes, doctor blades, brush rollers, etc. with water. They also could be washed from backgrays, rubber blankets with ease. There are two reasons why there was no oil-in-water type printing color on the market prior to this invention and its parent cases: (1) emulsifying agents which are suitable to produce oil-in-water emulsions and the necessary protective colloids, which secure stability, both reduce the washability of pigment prints. Present day binders do not take such reduction successfully. (2) If the same quantity of pigment color is dispersed in an oil-in-water emulsion color concentrate and in a water-in-oil concentrate, and both are reduced in varying proportions with clear cutback emulsions, the water-in-oil emulsion printing colors take more reduction to yield a certain shade, than oil-in-water emulsions. The reason is probably explained by the fact that most pigments are hydrophobic and organophilic, flush into the oil phase, and if the color bearing oil phase is the continuous phase of the emulsion, better mileage is obtained, pound for pound for colors. As the pigment colors are the most expensive ingredient of printing emulsion colors, economic factors excluded up to now the use of oil-in-water emulsions for printing, whereas they are used regularly for pigment padding, to obtain solid shades.

In my application Serial No. 91,009, filed May 2, 1949, now U.S. Patent No. 2,637,621, and in my co-pending application Serial No. 196,724, filed November 20, 1950, now U.S. Patent 2,681,322, various improvements are described relating to improved oil-in-water resin emulsion pigment printing colors, particularly with regard to selected resin binders and compositions which show advantages in the art. In my application Serial No. 169,791, filed June 22, 1950, now U.S. Patent No. 2,637,711, a special composition is described, which shows improvements and advantages in the art of oil-in-water resin emulsion pigment printing. In my application Serial No. 180,700, filed August 21, 1950, now U.S. Patent No. 2,637,705, improvements are described in the extender pastes and in oil-in-water resin emulsion pigment printing. In my co-pending application Serial No. 352,958, filed May 4, 1953, improvements are described in the method of preparing oil-in-water resin emulsion pigment printing colors and in my co-pending application Serial No. 352,959, filed May 4, 1953, improvements are described in the extender pastes used in oil-in-water resin emulsion pigment printing. The instant case is a continuation in part of my said co-pending applications Serial Nos. 196,724, 352,958 and 352,959, and of my said applications Serial Nos. 91,009, 169,791 and 180,700, with which the first-mentioned three were co-pending.

In accordance with this invention, improvement is achieved in making oil-in-water resin emulsion pigment colors using a special type of Alkyd resin in combination with an organic solvent soluble amino-aldehyde resin as the resin binder. The special alkyd resin contains (a) as the polyhydric alcohol component, 50–100% of a pentaerythritol based on the total of said polyhydric alcohol component, (b) a polybasic acid, such as phthalic anhydride, and (c) a poly-unsaturated fatty acid, which latter component is at least 50%, and not more than 65%, of said alkyd resin. The alkyd resin is advantageously in the emulsion polymerized state. The organic solvent soluble amino-aldehyde resin is in the proportion of at least 5%, and not more than 100%, based on the quantity of the alkyd resin present in the composition.

By the use of the resin binders of this application, advantages result in faster solidifying binders, increased toughness and better aging qualities of the prints obtained. Further, prints or dyeings obtained by the composition of this invention have improved resistance to crocking, to laundering and to dry cleaning. Details with regard to selection of pigments, proportions and inter-relationship of the various ingredients, such as resins, pigments, surface active agents (pigment dispersing agents and emulsifying agents), and protective colloids, will be specified further below.

To prepare such emulsions, the alkyd resins of this invention are advantageously bodied to a relatively heavy viscosity and then emulsified, in the presence or absence of solvents, such as hydrocarbon solvents. The dispersed phase of such emulsions is the alkyd resin.

In the case of emulsion polymerization, the dispersed phase particles of such emulsions are then aggregated by employing hydrogen peroxide, or in other known ways. (Emulsion polymerization is described in patent application Serial No. 739,945, filed April 7, 1947, now U.S. Patent 2,530,370, with which the above-mentioned Serial No. 91,009 was co-pending.) The degree of aggregation of the dispersed particles in situ is such as to render the emulsion highly sensitive to the action of air when spread in thin films and thereby provide for the formation of a coherent solid film immediately upon demulsification of the emulsion. Advantageously the pH value of the emulsion is retained within certain limits during the aggregation treatment. Improved results are obtained by the treated emulsions of this specification if the increase in oxygen content of the solidified fatty acid esters is kept low, when compared with the oxygen content of the same esters before emulsification and emulsion aggregation.

A further aspect of the improvement of this invention embodies a special pigment dispersion, the composition and preparation of which is described below. By this special dispersion, improved color yield can be obtained.

A still further feature of the improvement of this invention is the provision of a special clear extender emulsion which further improves the color yield.

ALKYD RESINS

Typical of the oils, the fatty acids of which may form the esters used in this process are as follows:

Tung oil
Oiticica oil
Dehydrated castor oil
Linseed oil
Perilla oil
Sunflower oil
Poppyseed oil
Soya bean oil
Walnut oil
Rapeseed oil
Pineseed oil
Olive oil
Corn oil
Cottonseed oil
Coconut oil
Babassu oil
Hydroxylated oils such as castor oil, etc.
Fish oils (train oils) such as, menhaden oil Segregated fatty acids from the above oils which have increased content in poly-unsaturated fatty acids may also be used with advantage.

The following polyhydric alcohols are suitable for producing esters with the above fatty acids:

Glycerin
Pentaerythritol
Mannitol
Sorbitol
Alcohols formed by the condensation of bis-phenol and epichlorhydrin
Certain polyglycols, amongst others The esters of this invention contain in all cases at least 50% of pentaerythritol as the poly-hydric alcohol component.

To form the fatty acid modified alkyd resins of this invention, the following polycarboxylic acids and their anhydrides may be used:

Phthalic acid
Maleic acid
Succinic acid
Malic acid
Tartaric acid
Fumaric acid
Citric acid
Adipic acid
Sebacic acid
Azelaic acid
Suberic acid, etc. or anhydrides of such acids, also Carbic anhydride The alkyd resins of this invention may be further modified by styrenating them.

The resin component of this invention contains in addition to the alkyd resin herein described an organic solvent soluble aminoaldehyde resin. Such amino-aldehyde resins are, for instance, condensation products of urea or melamine, or of alkylated or etherified urea or melamine with aldehyde, such as formaldehyde. Other amino-aldehyde resins which are known in the art which are solvent soluble may also be incorporated.

Commercial examples of organic solvent soluble amino-aldehyde resins are as follows:

| Manufacturer | Trade Name | Solids | Solvent |
|---|---|---|---|
| Rohm & Haas Co. (Resinous Products Div.) | Uformite F158 | 50 | Xylol-Propanol (3:7). |
| | Uformite F200E | 50 | Xylol-Butanol (1:1). |
| | Uformite F210 | 50 | Do. |
| | Uformite F266E | 50 | Capryl-Alcohol-Butanol. |
| | Uformite F223 | 50 | Xylol-Butanol (1:1½). |
| | Uformite F240 | 60 | Do. |
| | Uformite F240N | 60 | High Flash Naptha. |
| | Uformite MM-46 | 60 | Xylol-Butanol (1:1). |
| | Uformite MM-55 | 50 | Xylol-Butanol (1:4). |
| | Uformite MM-55HV | 50 | Xylol-Butanol (1:9). |
| | Uformite MU-56 | 50 | Xylol-Butanol (1:3). |
| | Uformite MX-61 | 60 | Xylol-Butanol (1:1). |
| | Uformite M-311 | 50 | Xylol. |
| Reichhold Chemicals, Inc. | Beckamine 3520 | 50 | Xylol-Butanol. |
| | Beckamine P-138 | 60 | Do. |
| | Beckamine P-196 | 60 | Butanol-Ethanol. |
| | Beckamine P-198 | Accelerator | |
| | Beckamine P-354 | 50 | Xylol-Butanol. |
| American Cyanamid Co. | Beetle 212-9 | 60 | Butanol-Octyl Alcohol-Petroleum Aromatic. |
| | Beetle 216-8 | 60 | Xylol-Butanol. |
| | Beetle 219-8 | 50 | Do. |
| | Beetle 220-8 | 50 | Do. |
| | Beetle 227-8 | 50 | Do. |
| | Beetle 230-8 | 50 | Do. |
| | Melmac 243-3 | 60 | Do. |
| | Melmac 245-8 | 50 | Do. |
| | Melmac 247-10 | 60 | Butanol. |
| | Melmac 248-8 | 55 | Xylol-Butanol. |
| Monsanto Chemicals Co. | Resimene 875 | 50 | Butanol-Xylol. |
| | Resimene 876 | 50 | Do. |
| | Resimene 877 | 50 | Butanol-Mineral Spirits. |
| | Resimene 878 | 50 | Butanol-Butyl Cellosolve. |
| | Resimene 881 | 60 | Butanol-Xylol. |
| | Resimene 882 | 65 | Xylol. |
| | Resimene 883 | 60 | Butyl Cellosolve-Mineral Spirits. |
| (Plaskon-Barrett Div.) Allied Chemical & Dye Corp. | Resimene U-901 | 50 | Butanol-Xylol. |
| | Resimene U-920 | 60 | Do. |
| | Plaskon 3382 | 55 | Xylol-Butanol. |

If the polyhydric alcohol component of the resins of this invention contains other alcohols than pentaerythritol, such other alcohol should be preferably at least tri-hydric, such as glycerin.

Best results are obtained with alkyd resins in which the fatty acid component is at least 50%, which fatty acids have at least twelve carbon atom chain lengths and have at least two double bonds. In this definition of fatty acids, there is included the group of fatty acids deriving from drying and semi-drying fatty oils; further, the group of synthetic fatty acids. Any appropriate mixture or combination of members of the above class of fatty acids may be used. The better drying the fatty oil is, from which the fatty acids are derived, the more suitable they are for the present process. I have found that at least some of the fatty acids in the alkyd resin component of this invention should preferably contain more than one double bond in the molecule. These fatty acids are the ones deriving from drying oils and semi-drying oils. I also found that esters of fatty acids having conjugated double bonds undergo easier emulsion aggregation process than fatty acids with isolated double bonds.

EMULSION AGGREGATION

The emulsion polymerization or emulsion aggregation process and its reaction conditions is described in detail in my United States Patent No. 2,530,370. The aggregating agent is oxygen. I believe that the active agent of my process is an electrically charged oxygen particle. However, I have no definite proof of that supposition. As not any and all oxygen may act in my process as aggregating agent, I shall refer to the oxygen which is suitable in my process as "active oxygen" and I believe that the particles of this active oxygen are most probably electrically charged.

I can obtain my active oxygen in various ways. (1) I may use a peroxide, such as a metal peroxide or hydrogen peroxide, or an organic peroxide to supply my active oxygen to my emulsions. (2) I may blow oxygen or an oxygen containing gas, such as air, through my emulsion. (3) I may use the oxygen which is present in the water phase of my emulsion as absorbed oxygen.

Application of heat accelerates the action of the oxygen. Usually temperatures between 50° C. and 80° C. are useful for such acceleration. Agitation of the emulsion also accelerates the process.

In case peroxides are used and oxygen is liberated in situ, further activation by agitation and/or heat is not a necessary requirement and the aggregation may be carried out in a satisfactory way at room temperature and even at temperatures lower than room temperature.

The concentration of the emulsion influences the rate of reaction. The 10% to 20% non-volatile containing emulsions will produce solidified particles faster than a 70% solid content emulsion. Very satisfactory results can be obtained around 50% non-volatile content.

Advantageous pH limits

One of the important criterions of my process is the pH of the emulsion. I found that it is important to have critical pH limits to carry out my process satisfactorily. I found that the reaction is extremely slow with a pH of 7 and there is a very slow range from about a pH of 5.7 to about 8.4. The range is very active below 5.7, such as for instance in the neighborhood of pH of 2.8 and also above 8.4, for instance in the region of pH of 10.5 and higher. In other words, the reaction is greatly accelerated by the pH values below 5.7 or above 8.4. However, for many purposes, if working on the alkaline side, I found it to be advantageous to have a pH of at least 10, and if working on the acid side, to have a pH which does not exceed 4.

It has been found that metallic driers are accelerating the emulsion aggregation process particularly in such cases in which the aggregation is carried out in an alkaline medium. Therefore, if metallic driers are desired to be present in the fatty acid esters, it is of advantage to work on the alkaline side. However, if the absence of metallic driers is desired, a conversion in an emulsion on the acid side is more desirable. Further, it may be mentioned that conversion on the acid side is advantageous if a constant pH is desired. In case of emulsion aggregation on the alkaline side, the pH generally changes insofar as it gradually becomes lower.

In the illustrative examples of this specification, the process will be demonstrated on emulsions which are on the alkaline side of the pH range. This is meant to illustrate the process only and not to limit same.

Oxygen supplying agents

As mentioned further above, if other reaction conditions are proper, the oxygen content of the water, present in the emulsion, may be satisfactory.

Oxygen may be supplied to the emulsion in form of oxygen gas or oxygen containing gases, such as air, by bubbling through the emulsion such gases or by introducing them by known means. Ozone may also be used.

To produce oxygen in situ peroxides or other per-compounds may be used. In most of the examples, hydrogen peroxide is used to illustrate the addition of per-compounds. However, other peroxides may also be used, such as sodium peroxide, barium peroxide, magnesium peroxide, zinc peroxide, other metal peroxides, or organic peroxides, such as benzoyl peroxide, urea peroxide, etc. Examples of percompounds are further perborates, percarbonates, persulfates, such as potassium, sodium and ammonium persulfates, perchlorates, pyrophosphate peroxides, oxonides, etc. The criterion of the usefulness of these agents is that they should supply oxygen in situ under the reaction conditions applied in my process and that the emulsion could be prepared in such a way that it should not break in their presence.

Oxygen content

In my process the oxygen content of the emulsified fatty acid esters increases very little, if any, during the emulsion aggregation process. The oxygen content increase is not more than 2.8% and advantageously not more than 1½%. In most cases the oxygen content increase is less than ½%.

pH of emulsions

Great advantages can be obtained on acid side emulsion polymerization, e.g. emulsions with metal free or drier-free formulation, can be successfully emulsion polymerized on the acid side, at pH ranges of 2.8 to 5. Such metal-free emulsions have advantages in discharge printing, as the metallic driers are readily reduced by the formaldehyde sulfoxylate or hydrosulfite to metal and the gray colloidal metal deposit, dulls and discolors the prints. Lively colors can be obtained with metal-free emulsions.

Many cation active emulsifying agents work better on the acid side. Also these require advantageously acid emulsion polymerization.

EMULSIFYING AGENTS

Great variety of emulsifying agents may be used in my process. A list of such emulsifying agents is given, for instance, under the title of Surface-Active Agents in the January 1943 issue of Industrial and Engineering Chemistry, on pages 126 to 130.

Soaps of fatty acids are for instance satisfactory emulsifying agents. A list of some others is given herewith:

| Trade Name and Source | Manufacturer's Description |
| --- | --- |
| Duponol ME, E. I. du Pont de Nemours & Co. | Fatty alcohol sulphate, sodium salt. |
| Aerosol OT, American Cyanamid Co. | Dioctyl ester of sodium sulphosuccinic acid. |
| Emulphor AG, General Dyestuff Corp. | Polyethyleneoxide condensation product. |
| Beta Sol, Onyx Oil & Chemical Co. | Quaternary ammonium salt. |
| Igepon, General Dyestuff Corp. | Sodium sulphonate of an oleic acid ester of an aliphatic compound, for instance, of the type of $C_{17}H_{33}COH-(OH_3)-C_2N_4SO_3Na$. |
| Triton 720 and 770, Rohm & Haas Co. | Sodium salt or aryl alkyl poly ether sulphonate. |
| Emulgor A., Glyco Products. | A highly polymerized glycol ester. |

I found that from the various emulsifying agents such types are most suitable, which are active both on the acid side and on the alkaline side. The non-ionic emulsifying agents belong to that class, such as for instance, nonaethyleneglycolmonooleate, or the corresponding dioleate, or the corresponding monolaurate or dilaurate or monoricinoleate or diricinoleate (Glyco Products). A further satisfactory group is the one of the cation-active emulsifying agents. Examples are the quarternary ammonium salts. As will be seen, the fatty alcohol sulphates (for instance, Duponol ME) are also suitable for my process.

PROTECTIVE COLLOIDS

In the examples of this specification casein, methylcellulose and sodium carboxymethylcellulose are mentioned as suitable protective colloids. Others which may be used are: gum tragacanth, dextrin, starch solutions, sodium acrylate, sodium methacrylate, sodium polyacrylates, hydroxy ethylcellulose of the water soluble and alkali soluble types, locust bean gum, water soluble salts of the maleic adduct of styrene, etc. Alginates may be used also, or albumin or soya protein. Other examples are water soluble ethyl-hydroxy ethyl cellulose, carboxy methylstarch, hydroxy-propyl-starch ether, polyvinyl pyrolidone, amongst others.

As far as protective colloids and emulsifying agents go, care should be exercised that anionic and non-ionic agents and systems may be mixed, and cationic agents and systems may be mixed with non-ionic agents and systems, but cationic and anionic agents or systems normally cause flocculation of the emulsion or of the pigments. Ammonium caseinate, e.g., acts anionic, but it is possible to use casein in cationic systems, if it is dissolved with the aid of cationic quaternary ammonium compounds.

CATIONIC EMULSIFYING AGENTS

Satisfactory oil-in-water emulsions can be prepared with cationic agents. Most of them, however, work on the acid side only. Many times alkaline pH is of advantage for certain purposes.

The main difficulty is to find proper cationic pigment dispersion agents in water, as most of them act as flushing agents, which will drive the pigment from the water to the oil phase. Pigment flocculation occurs with such agents, should they be used with oil-in-water emulsions, particularly if they are emulsion polymerized, as the pigment is not in direct contact with the oil phase. Either the emulsion breaks or the pigment flocculates, or both.

I have found very satisfactory results with lauryl pyridinium chloride, cetyl-dimethyl-benzyl ammonium chloride (Triton K–60, Rohm & Haas), methyl dodecyl benzyl trimethyl ammonium chloride (Hyamine 2389, Rohm & Haas Co.), stearylamine acetate and laurylamine acetate, amongst others.

They may be used as emulsifying agents to form oil-in-water resin emulsions and the first and third mentioned ones act as good pigment dispersing agents also.

In addition to the resins, which are present in emulsified form in the textile decorating compositions of this invention, the pigments are essential components. Here below is a list of organic pigments useful in this invention and also a preferred method of making water dispersions from such organic pigments.

THE USEFUL ORGANIC PIGMENTS AND PREFERRED METHOD OF MAKING WATER DISPERPERSIONS THEREOF

The organic pigments used herein are usually prepared by precipitation methods. They are all water insoluble. As starting material for this invention, either a filter press cake or dry powder can be used. Carbon black, if used, is not made by precipitation method and is used as dry powder in the process.

The following groups of pigments are exemplifying, but not limiting the scope of the starting materials of this invention.

(1) *Phthalocyanine pigments.*—Phthalocyanine blue, which is a copper or tin-copper phthalocyanine is marketed under trade names of Monastral Fast Blue by E. I. duPont de Nemours & Co., and as Heliogen Blue by General Dyestuff Corporation.

Phthalocyanine green, which is a chlorinated copper phthalocyanine color, is marketed under trade names of Monastral Fast Green, by E. I. du Pont de Nemours & Co., and as Heliogen Green by General Dyestuff Corporation.

(2) *Insoluble azo pigments.*—Benzidine yellows are couplings between dichlorobenzidine and acetoacetic arylides, such as the acetoacetic-anilide, -ortho toluidide, -xylidide, -para chloro anilide and -ortho chloro anilide.

Benzidine orange is a coupling product of dichloro-benzidine with pyrazolone substitution products, such as methyl phenyl pyrazolone.

Hansa Yellows are acetoacetic arylide couplings with substituted anilines, like 4-chloro-2-nitroaniline, or orthonitraniline, amongst others.

Insoluble Azo Reds are coupling products of the Naphthol AS type compounds of beta-ortho-naphthoic acid, such as Naphthol AS, Naphthol AS–OL, Naphthol AS–BS, Naphthol AS–D with fast color salts, such as 2,5 dichloroaniline, p-nitro-orthotoluidine, p-nitro-orthoanisidine amongst others. One example being the coupling product of Naphthol AS–ITR with ITR Fast color salt (Fast Red Color Salt ITR).

Naphthol AS type couplings may yield also yellows and oranges of the insoluble azo pigment group. Aniline Black pigment can be listed here too.

Toluidine Maroon and Dianisidine Blue and a brown pigment obtained by forming the copper salt of paranitraniline red are other examples.

(3) *Vat pigments.*—Vat pigments are of the indigoid or anthraquinone type. The indigoid type includes thioindigo derivatives and the anthraquinone type includes derivatives of Flavanthrone, Benzanthrone and complex structures made by condensing benzanthrone molecules.

Thioindigo Red B has Color Index No. 1207 and Schultz No. 912. For formulation, i.e. structural formula see pages 206 and 269 in Pratt: Chemistry and Physics of Organic Pigments, John Wiley & Sons, 1947.

Indanthrene Blue Color Index No. 1106, Schultz No. 837 is an example of the anthraquinone type vat pigments.

Structural formulas of some vat pigments are listed on pages 429 to 435 in volume V of Mattiello: Protective and Decorative Coatings, John Wiley & Sons, Inc., New York, 1946. They include Indanthrene Rubine BD, Indanthrene Orange BBTA, Indanthrene Golden Orange GA, Indanthrene Brown RA, Helio Fast Yellow 6GL, Indanthrene Brilliant Violet 3BA, Fast Violet 4RN, Indigo Blue, Indanthrene Navy Blue RA.

(4) *Carbon blacks.*—Furnace Blacks, Channel Blacks, acetylene gas blacks and lampblacks can also be dispersed by the instant process.

In the improved pigment dispersion method of this invention the following dispersing agents are preferred:

Fatty alcohol sulfates, such as sodium, ammonium or triethanolamine salts of sulfates of lauryl alcohol, cetyl alcohol, oleyl alcohol and their mixtures. These agents are known in the art to form emulsions and are used as detergents, but their use as pigment dispersing agents is believed to be novel.

Sulfates of hydroabietyl alcohol act similarly to fatty alcohol sulfates.

Examples of commercial products are Duponol ME, which is a dry powder form of sodium lauryl sulfate, manufactured by E. I. du Pont de Nemours & Co., and Duponol WA paste, which is a water paste of the same compound, containing 30% active ingredient and some inorganic salt impurities.

It was found that the action of fatty alcohol sulfates is greatly enhanced and improved by using as further additive a minor quantity of sodium alkyl naphthalene sulfonates, such as the isopropyl naphthalene sulfonate and the isobutyl naphthalene sulfonate. The former is marketed under the trade name of Nekal A by the General Dyestuff Corporation and the latter as Nekal DK by the same company.

Further improvement in degree of deflocculation of the pigment is obtained, by adding protective colloids to the water dispersion, such as casein and methylcellulose.

The proportions of surface active agent to pigment content is very important. The fatty alcohol sulfates may be added, for instance, in proportions of 2 to 20% per 100 parts of dry pigment, but for complete deflocculation of the pigment at least 10% and preferably 15 to 20% are used. Higher proportions of fatty alcohol sulfate are permissible, but does not seem to produce further improvement, in deflocculation, to a degree to warrant such increase. Larger proportions may be used, however, to satisfy specialty purposes of incorporation into finished products or to satisfy machinery limitations.

The sodium alkyl sulfonates are added in proportions of ½% to 4% based on the pigment content, 2% being a preferred and satisfactory proportion.

If protective colloids are added, about 1% of dry casein is used, based on the dry pigment content and about 5% methylcellulose low viscosity type, designated as 15 cps. type in the trade. Larger quantities of protective colloids can be added, but their action is distinct in the here given proportions. They help to complete deflocculation and keep the particles in suspension.

These improved pigment dispersions are particularly advantageous in coloring latex compositions for dipping or knife coating or roller coating applications, and for use in paper beater coloring applications, also wherein increased color values are obtainable.

I have found that some pigments require larger proportions than 20% surface active agent, and the required percentage may go up as high as 40%.

A further improvement of the pigment dispersion step of this invention consists in carrying out the deflocculation of the pigment at elevated temperature which ranges from above room temperature to below the boiling point of water, as for instance, 90° C.

PROPORTIONS OF INGREDIENTS

The proportions of the ingredients of the compositions of this invention may tolerate certain limits. The examples here below illustrate the process and do not necessarily limit same.

*Pigment content.*—The proportions of pigments vary depending on the type used. In addition to the pigments listed further above in this specification, some inorganic pigments are also used in pigment printing compositions (resin emulsion color concentrates), in particular, artificially prepared iron oxide pigments (yellows, reds, browns and blacks), cadmium pigments (yellows, oranges, red and maroons), and white pigments such as titanium dioxide, zinc oxide and zinc sulfide pigments.

The pigment content of the color concentrates of this invention ranges from about 4.5% to about 20% with the organic type pigments, 8% to about 23% with the inorganic pigments, and, in case of titanium dioxide, it may go up to about 40%.

*Resin content.*—The non-volatile resin content of the color concentrate compositions of this invention ranges from about 6% to about 20.5% and, in most cases, is between the range 7% to 13%.

Based on 1 part dry pigment, depending on the type of pigment used, the non-volatile resin content may range from about 0.25 part to about 4.5 parts.

*Protective colloid content.*—The protective colloid content of the color concentrates ranges from about 1% to about 5.5%. If casein is used as part of the protective colloid, I prefer to use it in the range of 1% to 3.5% of the composition. Low viscosity methylcellulose, such as methylcellulose 15 cps., may be advantageously used in the proportions of 0.5% to 2% of the composition.

To show the interrelationship of pigment to protective colloid, I may mention that on 1 part of pigment the total protective colloids range from about 0.05 part to about 1.5 parts. Casein, if used, may be used in the range of 0.05 part to 0.75 part for each 1 part of pigment. The low viscosity methylcellulose range is preferred to be from 0.01 part to 0.40 part for each 1 part of pigment. The preferred range of casein is from 0.08 part to 0.20 part and for the methylcellulose low viscosity from 0.015 part to 0.060 part for each part of dry pigment. The methylcellulose proportion may go up frequently to 0.120 part for each part of dry pigment. The methylcellulose proportion may go up frequently to 0.120 part for each part of dry pigment.

*Proportion of surface active agents.*—As many pigment dispersing agents may act as emulsifying agents and vice versa, the proportion of total surface active agents relating to the total quantity of the composition is being given here. The surface active agent proportion mentioned here below relates to the sum of the pigment dispersing agents and emulsifying agents. The quantity of the surface active agents in these compositions is from about 1.6% to about 4.5%, but, in the case of higher pigmented compositions like whites, it may go up as high as 7.5%. All percentages are based on the total weight of the composition.

Based on 1 part of dry pigment, the range of surface active agents is from about 0.07 part to about 1 part.

It should be understood that the portion of the surface active agents which is used to disperse the pigments is based on the pigment content and ranges normally up to 20% based on the pigment and, in some extreme cases, up to 40%, whereas the portion which acts as emulsifying agent for the resins and oil phase in general is related to the quantity of the oil phase present in the pigmented resin emulsion composition. I may mention that 2 to 6% of emulsifying agent is used in most cases for emulsifying purposes, based on the dispersed phase (oil phase) content of the pigmented resin emulsion composition.

The color concentrate compositions of the present invention are viscous by nature and are dilutable with clear extender print paste emulsions to form the desired strength of shade when used for textile printing.

PENTAERYTHRITOLS

According to this invention, at least 50% of the polyhydric alcohol component of the alkyd resin should be pentaerythritol. However, the higher the pentaerythritol content, the better the chemical resistance and toughness of the deposited resin emulsion films become. In most cases, pure pentaerythritol esters are preferred and give superior results. The following table illustrates compositions and constants of some pentaerythritol alcohols useful in this process.

| Alcohol | Composition | Melting Range, °C. | Molecular Wgt. | Combining Wgt. |
|---|---|---|---|---|
| Pentaerythritol | Pure grade | 259.5–260.5 | 136.1 | 34.0 |
| Dipentaerythritol | do | 221–222 | 254.3 | 42.4 |
| Tripentaerythritol | do | 248–249.5 | 372.4 | 46.6 |
| Pentek | Approximately 85% Pentaerythritol and 15% Polyhydric Alcohols. | 185–225 | | 36.2 |
| Pentek-43 | Approximately 50% Pentaerythritol and 50% Dipentaerythritol. | 180–200 | | 39.8 |
| Polypentek | Mixture of Polymers | 225–235 | | 48.5 |

The combining weight in the preceding table means the number of weight units required to equal one hydroxyl group. These are average values and may vary slightly with different lots. Where great accuracy is desired, it is advisable to determine the hydroxyl value of the particular lot of pentaerythritol type alcohol.

Pentek is a designation for certain technical grades of pentaerythritol alcohols used by Heyden Chemical Corporation, New York 1, New York.

The table below lists the combining weights of many of the chemicals which are used with the pentaerythritol type alcohols:

| Chemical: | Combining weight |
|---|---|
| Maleic anhydride | 49.0 |
| Phthalic anhydride | 74.0 |
| Succinic acid | 59.0 |
| Adipic acid | 73.0 |
| Sebacic acid | 101.0 |
| Rosin (Acid No. 162) | 345 |
| Linseed oil fatty acids (Acid No. 198) | 284 |
| Soyabean oil fatty acids (Acid No. 202) | 278 |
| Stearic acid (Acid No. 198) | 284 |
| Tall oil, crude (Acid No. 150) | 374 |
| Tall oil, refined (Acid No. 175) | 321 |

*Preparation of alkyd resins: Illustrative resin example*

The preparation of mixed glycerol-pentaerythritol esters is illustrated by this example. The schematic constitution of the end product of this example is:

20% oil (linseed oil)
30% pentaerythritol ester of phthalic anhydride (with some maleic content)
50% pentaerythritol ester of tall oil Unit formula:

| | |
|---|---|
| Linseed oil | 20. |
| Tall oil | 47.61 |
| Phthalic anhydride | 19.41 |
| Maleic anhydride | 1.29 |
| Pentek | 16.67 |
| Total weighed in | 104.98 |
| Theoretical water of esterification | 4.98 |
| Expected yield | 100. |

The cooking procedure is as follows: Heat the linseed oil, tall oil and maleic anhydride to 150° C. (302° F.), hold there for ½ hour. Heat to 232° C. (450° F.), hold ½ hour at this temperature. Add then all the Pentek in installments within about 15 minutes. Keep temperature at 232° C. after all Pentek added for ½ hour, to form the monopentaerythritol ester, like the monoglyceride. Test a drop in denatured alcohol for turbidity. After this ½ hour it should be clearly soluble in alcohol. This step is needed, because the linseed oil is added as such and not as fatty acids. No catalyst is needed. 30 to 40 minutes are ample to obtain alcohol solubility. At this stage, drop temperature to 150° C. (302° F.), add all phthalic anhydride in increments within 10–15 minutes. Heat to 210° C. (410° F.), hold for 2 hours to get initial ester formation, raise temperature to 230° C. (446° F.), hold there for 4–4½ hours. Acid number should be less than 15, and viscosity at least C (Gardner-Holdt), when thinned to 50% solids with Mineral Spirits.

This example is shown primarily to demonstrate the preparation of making alkyd resins of the type useful in this process. The resulting resin of this example, however, is less suitable for this process on account of the rosin content coming from the tall oil component. In the examples following here below are the chemical and physical constants of some resins listed which are preferred for this process:

TABLE OF PREFERRED RESIN EXAMPLES—I

| | Resin A | Resin B | Resin C | Resin D | Resin E |
|---|---|---|---|---|---|
| Non-Volatile Content | 50% | 65% | 50% | 70% | 50% |
| Solvent | Min. Sp. | Min. Sp. | Min. Sp. | Min. Sp. | Min. Sp. |
| Oil Content—Percent oil on non-volatile (calculated) | 58% | 62% | 58% | 63% | 56% |
| Phthalic Anhydride (A.S.T.M. Des 563-45T) | 30% | 25% | 27½% | 25½% | 30.8% |
| Type of Oil | Soya | Segregated Soya | Soya | Soya | Soya |
| Polyhydric Alcohol | | | Pentaerythritol Technical 100% | | |
| Acid No | 3–7 | 8 | 8–13 | 6–10 | 4–7 |
| Viscosity—Gardner-Holdt | W–Y | Z1–Z3 | U–X | Y–Z1 | T–V |

Min. Sp. in the above table, under Solvent, is Mineral Spirits. Some of the organic solvent soluble melamine or urea resins are not miscible with Mineral Spirits; therefore, if such types of amino-aldehyde resins are used, the alkyd resins should be diluted with aromatic hydrocarbons, such as for instance, xylol. Such change in the solvent normally lowers the viscosity of the resin solution but otherwise does not change film characteristics.

Commercial examples of resins in the above list are:

Beckosol P–471 (Reichhold Chemicals Corporation)
Syntex 62 (Jones-Dabney Company)
Aroplaz 1086M, Aroplaz 1241M (U.S. Industrial Chemicals, Inc.)
P6118 (Dock Resin Corporation)

Whereas, with this invention, resins with a minium of 50% oil content are preferred, here below are listed chemical constants of two commercial pentaerythritol alkyd resins which are shorter in oil length and may, in some cases, yield satisfactory results:

TABLE OF PREFERRED RESIN EXAMPLES—II

| | Resin F | Resin G |
|---|---|---|
| Non-Volatile Content | 50% | 62% |
| Solvent | Xylol | Xylol |
| Oil Content, percent oil on non-volatile (calculated) | 35% | 42% |
| Phthalic Anhydride (A.S.T.M. Des 563–45T) | 40.6% | 38% |
| Type of Oil | Linseed | Soya |
| Polyhydric Alcohol | Pentaerythritol Technical 100% | Pentaerythritol Technical 100% |
| Acid No | 15–25 | 4–6 |
| Viscosity, Gardner-Holdt | X–Z | Z2–Z4 |

In the illustrative examples here below, the process is illustrated on Resin A where the solvent has been changed to xylol. In the case of emulsion polymerization, the process is illustrated on the alkaline side type emulsions and emulsion polymerization. These examples should be considered to illustrate the process and not to limit same. Alkyd resin, oil component of alkyd resin, amino-aldehyde resin, emulsifying agents, pH of emulsions, and type and percentage of protective colloids should be considered variable, within the described scope of this specification.

ILLUSTRATIVE EXAMPLES

*Example 1.—Pigment dispersions in water.*—Pigments which are by nature hydrophobic may be completely deflocculated as dispersions in water by incorporating sodium lauryl sulfate into a mixture of water and of the pigment, mixing the mixture and passing the slurry through a pigment dispersing equipment. For example, in this process, based on 100 parts of dry pigment, about 4% to about 20% sodium lauryl sulfate and, if desired, about ½% to about 2% short chain substituted alkyl naphthalene sulfonate, are mixed into the mixture of water and pigment. Generally speaking, the dispersion thus obtained preferably comprises a water-and-pigment mixture component and a dispersing agent component, wherein the water-pigment mixture component comprises about 14% to about 35% by weight of hydrophobic organic pigment and about 65% to about 86% by weight of water. The dispersing agent component comprises a water soluble fatty alcohol sulfate, for example, a sulfate of lauryl alcohol, cetyl alcohol, or oleyl alcohol. The dispersing agent component is preferably used in proportion of between about 9% and about 20% by weight of fatty alcohol sulfate based on the dry pigment content. The dispersing agent is preferably in solution in the water and the pigment is in direct contact with the solution. In the event artificially precipitated pigments are dispersed, the water-and-pigment mixture component may be a press cake collected in the filter presses. Examples of suitable pigments are: phthalocyanine pigments, such as copper phthalocyanine, insoluble azo pigments, vat pigments, and carbon black.

If desired, a protective colloid may be incorporated in the dispersion. If casein is used, it may be present in the proportion of ½% to 50% based upon the weight of the dry pigment. If the protective colloid is methylcellulose, it may be present in the proportion of 1% to 10% of the weight of the dry pigment. The dispersion may also be obtained by ball milling, pebble milling, or roller milling.

*Example 2.*—In this example, a resin mixture was used consisting of 90% of Resin A dissolved in xylol (instead of Mineral Spirits), having 50% non-volatile content and 10% butyl modified melamine formaldehyde resin, containing 50% non-volatile, 30% butanol, and 20% xylol. A suitable product is Melmac 245-8 of American Cyanamid Company. 42.15 parts of this resin mixture, 0.31 part of mixed naphthenate driers, 12.22 parts of 10% sodium lauryl sulfate solution in water, 20.65 parts of a 20% casein solution in water, containing antifouling agents, 5.48 parts of ammonium hydroxide solution prepared by mixing 1 part of concentrated ammonium hydroxide and 1 part of water, 10.54 parts of a 20% water solution of sodium carboxymethylcellulose, low viscosity type, and 8.65 parts of water are made into an emulsion in the following manner: Add to the resin solution under agitation ⅔ of the sodium lauryl sulfate solution, mix the remaining ⅓, the water and the casein solution in a separate container and add them slowly to the resin solution containing mixture under agitation. Add the ammonium hydroxide solution and add finally the sodium carboxymethylcellulose solution. Homogenize. This emulsion is a suitable binder for color concentrates.

*Example 3.*—To a phthalocyanine green press cake, marketed under the trade name of Heliogen Green GV presscake, having 27.6% pigment content, Duponol ME dry powder was added to yield 18% Duponol on the pigment content, and Nekal A dry powder was added to yield 2% addition on the pigment content. The press cake was mixed with a spatula by hand; after 5 minutes it became completely liquid. It has been found, that dry powder addition, which is attractive as it does not increase water content, yields very satisfactory results. However, the pre-mixing represents some problem and knife-pronged agitators are needed, such as pony mixer blades, to liquefy the press cake to a slurry. Propeller types, or other turbine type agitators do not work well at this stage, as they could not manage to break up the lumps of the press cake. The pre-mix is then further dispersed by the aid of an Eppenbach homomixer, which is a high speed turbo mixer, having a narrow clearance between turbine and stator. It runs about 3,600 r.p.m. About 15 minutes is satisfactory but occasionally up to 30 minutes may be used. A 5 H.P. motored mixer satisfactorily disperses a 500 lb. press cake quantity in a 55 to 60 gal. size drum. (Open head drum.) The active ingredient in Duponol ME dry powder is the same as that of Duponol WA paste, i.e. technical sodium lauryl sulfate.

The homomixed slurry is passed through a colloid mill, to complete dispersion and deflocculation. Pebble milling is also very satisfactory to complete pigment deflocculation and dispersion. 24 hours to 48 hours are satisfactory milling times.

*Example 4.*—59 parts of the binder emulsion of Example 2, 26.25 parts of the phthalocyanine pigment dispersion in water of Example 3, 2.9 parts of a 60% polychoroprene latex, 3.9 parts of pine oil, and 7.95 parts of water are mixed and homogenized, to form a color concentrate. Other pigments may be used instead of the phthalocyanine blue, as described further above in Example 1 and in other places of this specification.

*Emulsion polymerized resin binders*

If the resin binder is "emulsion polymerized" or emulsion aggregated, advantages result in faster solidifying binders, increased toughness and better aging qualities of the prints obtained.

*Example 5.*—An emulsion-aggregated binder is prepared from the resin mixture solution of Example 2, according to Example 2, by the following changes: deducting 3.58 parts of the water added, and adding 3.58 parts of a 30 volume percent hydrogen peroxide solution to the emulsion at the stage after the ammonium hydroxide solution was added, but before the sodium carboxymethylcellulose solution is added. The hydrogen peroxide is added in increments, while the emulsion is slowly agitated. The addition of the hydrogen peroxide may be carried out during a 2 to 12 hour period. The sodium carboxymethylcellulose solution is added, after the emulsion aggregation process is completed.

*Example 6.*—A color concentrate is made of the product of Example 5, by first preparing a pigment grind from 1359 parts of Naphthol AS type pigment red, 2000 parts of resin mixture solution of Example 2, 1179 parts of xylol, and 136 parts of wetting agent mixture, consisting of one-third alkyl aryl polyether alcohol, one-third zinc naphthenate and one-third soya lecithin. A color concentrate is prepared by mixing 59 parts of the emulsion of Example 5, 2.9 parts of polychloroprene latex 60% N.V., 12 parts of water, 15 parts of xylol, and adding thereto slowly, under proper agitation a mixture of 30.2 parts of the here-described red pigment grind and 0.9 part of a sodium salt of alkylated aryl polyether sulfonate, as emulsifying agent. The pigment grind is thereby emulsified into the binder emulsion. The resulting product is homogenized by passing it through a colloid mill. The pigment grind can be prepared on a three-roller paint mill.

*Example 7.*—5.90 parts of the emulsion of Example 5, 47.05 parts of a 3% water solution of 4000 cps. methylcellulose, 47.05 parts of water are mixed and homogenized. Under agitation with a suitable mixer, like the Eppenbach homomixer, 100 parts of Mineral Spirits are stirred into the former emulsion in increments. The Mineral Spirits used in this example has a bulking value of 0.1515 gallon per pound, a flash point of 100° F., a kauri-butanol value of 44 to 46, and is marketed by the American Mineral Spirits Company under the trade name of Amsco Mineral Spirits #46.

*Example 8.*—To make an extender print paste similar to Example 7, but where the volumetric relation of solvent to water phase is changed to yield a lower solvent percentage: 23.563 parts of a 3% methylcellulose solution in water, using 4000 cps. methylcellulose, 23.563 parts of water and 2.874 parts of concentrated resin emulsion of Example 5, are mixed and 45.710 parts of Mineral Spirits of Example 7 are incorporated in a manner as described in Example 7. The resulting emulsion has a somewhat lower viscosity than the product of Example 7. This extender emulsion has about 0.739% methylcellulose, 48.499% water, 47.759% of solvent and 3.003% reinforcing concentrated resin emulsion.

*Example 9.—Resin-free extender paste.*—0.750 part of 4000 cps. high viscosity methylcellulose is dissolved in 49.250 parts of water. 50 parts of Mineral Spirits of Example 7 is incorporated in increments, under proper agitation. A viscous print paste is obtained.

*Example 10.—Extender print paste of Example 7, where one-half of methylcellulose is replaced by water.*— 0.353 part of 4000 cps. high viscosity methylcellulose is dissolved in 46.773 parts of water, yielding an 0.75% methylcellulose solution. This is mixed with a concentrated oil-in-water resin emulsion of Example 5, taking 2.874 parts of the latter. The resulting product is agitated and 50 parts of Mineral Spirits of Example 7 are incorporated in increments under proper agitation. The resulting print paste is similar to that of Example 7, except, that on account of 50% lower content in high viscosity methylcellulose, its water phase and consequently the emulsion has lower viscosity. The product is a fluid viscous emulsion with good printing qualities.

Other formulations having various relationships of ingredients may be used for the extenders. In the following table, proportions by weight are shown of the various ingredients, assuming the water content to be 100 parts. In these examples where reinforcing resin emulsions may be used, those resin emulsions were not considered in the computation and the ensuing analysis is based on the residual part:

| Solvent | High Viscosity Cellulose Ether | Other Ingredients |
| --- | --- | --- |
| 107.712 | 1.523 | |
| 62.694 | 0.887 | |
| 98.476 | 1.524 | |
| 101.523 | 1.523 | |
| 84.388 | 1.266 | 0.938 Duponol ME. |
| 83.604 | 1.254 | 0.929 Duponol ME. |
| 92.813 | 1.524 | |
| 100.756 | 0.756 | |
| 83.291 | 1.249 | 0.925 Duponol ME and 1.426 Aerotex M-3 dry. |
| 82.655 | 1.240 | 0.918 Duponol ME and 4.545 Aerotex M-3 dry. |
| 106.900 | 0.754 | |
| 107.304 | 1.138 | |
| 104.480 | 1.477 | |
| 103.713 | 0.732 | |
| 103.092 | 1.522 | |
| 89.744 | 1.522 | |
| 80.569 | 1.246 | 0.562 Duponol ME. |
| 76.740 | 1.260 | 0.536 Duponol ME. |
| 87.418 | 1.236 | 0.583 Duponol ME. |
| 53.122 | 0.750 | 0.472 Duponol ME. |
| 97.944 | 1.469 | 0.392 Duponol ME. |

*Example 11.—Schematic formula for a concentrated resin emulsion.*—In this example, a schematic formula is given to prepare a concentrated resin emulsion suitable in this invention. Resin examples are also listed, which can be satisfactorily used in this schematic formula.

| | Percent |
| --- | --- |
| Resin mixture of Example 2 | 41.84 |
| Driers, as below | 0.63 |
| Pine oil | 0.46 |
| 10% Duponol ME sol., in water | 12.11 |
| 20% casein sol. in water, as below | 20.58 |
| Mixture of 50% conc. ammonia and 50% water | 5.40 |
| Low viscosity methylcellulose solution, as below | 15.44 |
| Hydrogen peroxide 30% | 3.54 |
| | 100.00 |

Non-volatile content 28–29

Drier mixture for schematic formula:
Lead naphthenate __ 24% metal content sol., 200 parts b.w.
Cobalt naphthenate _ 6% metal content sol., 25 parts b.w.
Zinc naphthenate ___ 6% metal content sol., 30 parts b.w.

Casein solution for schematic formula:
Casein, dry _____ 7.75 parts b.w. (Protovac 8397, Borden Co.).
Water _____ 31. parts b.w.
Dowicide A _____ 0.0775 parts b.w. (1% on casein) Dow Chemical Co. (a fungicide).
Dowicide G _____ 0.0775 parts b.w. (1% on casein) Dow Chemical Co. (a fungicide).
Ammonia, conc. _____ 0.1163 parts b.w. (1½% on casein).

Low viscosity methylcellulose solution for schematic formula:
Methylcellulose, 15 cps_ 2.09 parts by wt.
Water _____ 13.35 parts by wt.

Order of addition in suitable emulsifying equipment:
(1) Resin solution, drier sol., pine oil mixed
(2) Duponol solution added
(3) Casein solution added
(4) Ammonia solution added
(5) Hydrogen peroxide added in increments
(6) Methylcellulose solution added Methylcellulose solution may be present before hydrogen peroxide addition. If e.g. sodium carboxymethylcellulose (CMC) replaces methylcellulose, it is preferable to add it after hydrogen peroxide addition.

Resins suitable for schematic formula, amongst others, are: Resins A, B, C, D and E—referred to in table, marked I, entitled "Table of preferred resin examples"; Resins F and G—referred to in table, marked II, entitled "Table of preferred resin examples"; and the commercial resins listed further above. Solvents used in above resins are aromatic and/or aliphatic hydrocarbons.

10 to 20% of resin solution in the schematic example, may be replaced with amino-aldehyde resins, which contain 50% N.V. in solvent mixture of alcohols and hydrocarbons, e.g.:

Melmac 245–8, butyl modified melamine formaldehyde resin, Am. Cyanamid Co.
Melmac 248–8, butyl modified melamine formaldehyde resin, Am. Cyanamid Co.
Uformite MM55 butyl modified melamine formaldehyde resin, Rohm & Haas Co.
Uformite MX61 alkyl modified triazine resin, Rohm & Haas Co.
Uformite F240 alkyl modified urea formaldehyde resin, Rohm & Haas Co.
Beetle 216–8 alkyl modified urea formaldehyde resin, Am. Cyanamid Co.

The same emulsions with the resins described above, can be prepared without emulsion polymerization, using water instead of the hydrogen peroxide in the schematic formula. Such emulsions are similar in nature to the one described in Example 2. In some instances, the films they form may have a shorter life and the film formation period might be longer, than compared with the emulsion polymerized product.

*Example 12.—Schematic formulation of pigment color concentrates.*—In the schematic formula for pigment color concentrates, I prefer to use 59 parts of concentrated resin emulsion of Example 11, 2.9 parts of polychloroprene latex, 60% non-volatile, like neoprene 601 latex of E. I. du Pont de Nemours & Co. and pigments in proportions of 7–9% pigment content in the color concentrate. The pigments may be incorporated in a manner described in Example 4, using pigment dispersions in water similar to that of Example 3.

If desired, there may be substituted for the polychloroprene latex of Examples 4, 13, and 12, the concentrated resin emulsion of Example 11 or other suitable synthetic latices.

The following pigments may be used satisfactorily: Yellow; Benzidine Yellow; Orange; Benzidine Orange; Green; Phthalocyanine Green; Blue; Phthalocyanine Blue; or Indanthrene Blue; Maroon; Thioindigo Maroon; Red; various insoluble azo pigments of the Naphthol AS type couplings; or Thioindigo Reds and Pinks; Brown; various azo browns and vat browns; Greys and Blacks: Carbon Black, such as furnace blacks and channel blacks, gas blacks, bone black, vegetable black, various vat blacks and greys.

The 59 parts of concentrated emulsion contains about 12.3 parts of resin solids, 2.4 parts of casein, 1.2 parts of low viscosity methylcellulose, 0.7 part of emulsifying agent, and 0.09 part of driers.

In this schematic formula, the binder to pigment ratio may be changed in a manner that the binder solids are reduced and the pigments solids increased. Color concentrates with pigment content up to 22% and concentrated resin emulsion content down to 30 to 40% may be suitable for many purposes.

The use of amino-aldehyde resins helps the formation of thermoset resin films and also assists in solubilization of the protective colloids.

Thioindigo Pink, mentioned further above, has Color Index No. 1211 and Schultz No. 910.

*Example 13.—Pigment padding.*—Because of the lightfastness of pigments and ease of their application, to obtain solid color effects, pigment padding is becoming more and more popular to replace dyeing. The pigmented oil-in-water emulsions of this invention are suitable for pigment padding. The color concentrates of Example 12 may be diluted with water to the desired color strength. If higher viscosity is required, a mixture of the color concentrate and some extender clear printing paste may be diluted with water. In some cases, it is advantageous to add water soluble protective colloids to increase the viscosity of the padding solution. Examples are high viscosity methylcellulose, high viscosity sodium carboxymethylcellulose, sodium or ammonium alginate, amongst others.

In the event low viscosities can be tolerated, the amount of protective colloid may be reduced in the binder emulsion and color concentrate, whereby laundering resistance increases.

There are two difficulties in the way of popularizing pigment padding. One is crocking. The binder emulsions, as formulated above, show very low crocking and can be considered as practically non-crocking for many purposes, thereby eliminating this drawback of pigment padding. The second difficulty is represented by the phenomenon called pigment migration. During the drying operation, the pigments migrate towards the heat and cause streaks and uneven color effects. If the drying tunnels or chambers show the slightest differences in spots with regard to temperature, pigment migration will take place. It is very difficult even with the most modern equipment to have uniform temperatures all over the drying chambers. The emulsion aggregated (emulsion polymerized) binders are solidified in the emulsion and therefore prevent the migration of the pigments. This particular performance of these new emulsions permits their use with great advantage in pigment padding to produce solid color effects by pigments. The presence of extender clear print-pastes of this invention and that of U.S. Patent No. 2,637,705, as part of the padding liquor, also helps to reduce pigment migration.

*Example 14.—Crock reducing agents.*—In the above examples, neoprene latex was used as crock reducing agent. I found that satisfactory crock reduction is obtained with the use of neoprene cements (solvent solutions), polystyrene emulsions, Vistanex (linear polymers of isobutylene), vinyl chloride polymers, acrylonitrile copolymers and mixtures of the last two mentioned polymers. One of the acrylonitrile copolymers useful as anti-crocking agent are the acrylonitrile-butadiene copolymers also known as Hycars. In the color concentrates, I may use from 0.1% to 2% crock reducing agent solids. In many instances, increase in the concentrated resin emulsion content may eliminate the necessity of using a special crock reducing agent.

The concentrated resin-binder emulsion may be increased, for example, to about 62% by weight based upon the total color concentrate composition.

The method of preparing resin emulsion color concentrates described in my co-pending application, Serial No. 352,958, is also suitable in connection with the pentaerythritol alkyd resins of this invention. The following examples illustrate this point:

*Example 15.—A schematic example of pigment dispersion in water.—*

| | Parts by weight |
|---|---|
| Pigment (Phthalocyanine Blue, dry basis) | 16.817 |
| Water | 66.9937 |
| Duponol ME | 3.027 |
| Nekal A (propylated naphthalene sulfonate) | 0.336 |
| Casein Duponol solution [1] | 1.488 |
| Dry methylcellulose, 15 cps. | 0.841 |
| Antifoam | 0.420 |
| Mineral Spirits (#46 Mineral Spirits Amsco) | 4.204 |
| 18% casein solution [2] | 5.930 |
| | 100.000 |

[1] Casein Duponol solution:

| | Parts by Weight |
|---|---|
| Water | 75.86 |
| Protovac 8397 (ammonium caseinate, The Borden Company) | 11.39 |
| Dowicide A (sodium O-phenylphenate, The Dow Chemical Co.) | 0.11 |
| Dowicide G (sodium pentachlorophenate, The Dow Chemical Co.) | 0.11 |
| Ammonia | 0.17 |
| Duponol WAQ | 12.33 |
| Antifoam | 0.03 |
| | 100.00 |

[2] 18% casein solution:

| | |
|---|---|
| Protovac 8397 | 18.00 |
| Water | 79.39 |
| Dowicide A | .18 |
| Dowicide G | .18 |
| Ammonia | 1.50 |
| Sequestrene ST [3] | .75 |
| | 100.00 |

[3] Sequestrene ST: 80% active ethylene diamine tetra acetic acid, sodium salt; Alrose Chemical Company.

*Examples 16, 17, 18, and 19.—Schematic examples of method of preparation.*—In Examples 16 to 19, the following resin mixture was made to form the oil phase:

| | Parts by weight |
|---|---|
| Resin 50% non-volatile content in xylol (such as resin of Resin A) | 88.8 |
| Butyl modified melamine resin (such as Melmac 245-8 of American Cyanamid Co.) 50% non-volatile (30% butyl alcohol and 20% xylol) | 9.8 |
| Drier mixture [1] | 1.4 |
| | 100.0 |

[1] Drier mixture:

| | Parts by Weight |
|---|---|
| Lead naphthenate drier 24% metal content | 64.00 |
| Cobalt naphthenate drier 6% metal content | 15.30 |
| Zinc naphthenate drier 8% metal content | 20.70 |
| | 100.00 |

| | Example 16 | Example 17 | Example 18 | Example 19 |
|---|---|---|---|---|
| Phthalocyanine Blue Slurry of Example 15 | 76.50 | 79.51 | 77.62 | 80.76 |
| Acrawax C Water Dispersion (a polyamide dispersion in water made by Glyco Products Co., Inc.) | .23 | .23 | .23 | .23 |
| Resin Mixture (Oil Phase) | 14.79 | 15.38 | 15.02 | 15.61 |
| 18% Casein Solution (described in Example 15) | 2.81 | 2.92 | 2.85 | 2.96 |
| 10% Duponol Solution | 4.21 | (dry) .44 | 4.28 | (dry) .44 |
| 50% Slurry of Methylcellulose 15 cps. (low viscosity) in Mineral Spirits | 1.46 | 1.52 | | |
| | 100.00 | 100.00 | 100.00 | 100.00 |

*Example 16.—Preparation.*—Mix under enclosed turbine high speed agitator like the Eppenbach homomixer the water phase and methylcellulose slurry; add the resin mixture (oil phase) slowly under continuous agitation. The resulting color concentrate has approximately 12.86% pigment content.

*Example 17.—Preparation.*—After premixing the water phase, add the 50% slurry of methylcellulose 15 cps. (low viscosity) in Mineral Spirits and then the resin mixture (oil phase). In this example, note that Duponol ME dry was used. The resulting color concentrate has approximately 13.3% pigment content.

*Example 18.—Preparation.*—Incorporate with the resin mixture (oil phase) under an enclosed turbine mixer the 10% Duponol water solution ME. To this oil phase which contains the Duponol solution dispersed therein, add a mixture of the blue slurry, Acrawax C and 18% casein solution in increments under thorough agitation using an enclosed turbine mixer. The resulting color concentrate has approximately 13.05% pigment content.

*Example 19.—Preparation.*—Prepare in the mixing vessel the oil phase, add under agitation the dry Duponol to disperse the latter in the former and add to this oil phase a pre-mixed mixture of the blue slurry, Acrawax C dispersion and the 18% casein solution in increments under thorough agitation using an enclosed turbine mixer. The resulting color concentrate has approximately 13.58% pigment content.

In Examples 16 and 17, the oil phase is added to the water phase; in Examples 18 and 19, the water phase is added to the oil phase. In Examples 17 and 19, dry Duponol is used; whereas, Examples 16 and 18 use Duponol solution in water.

*Example 20.—Schematic formula for color concentrates with high resin content.—*

|  | Parts |
|---|---|
| Phthalocyanine Blue slurry of Example 15 | 58.27 |
| Resin mixture (oil phase) of Examples 16 to 19 | 28.57 |
| Duponol WAQ | 2.71 |
| 18% casein solution of Example 15 | 10.45 |
|  | 100.00 |

Add the casein solution to the blue slurry, add the Duponol WAQ, and mix these 3 ingredients. Incorporate the resin mixture by adding it slowly in increments to the water phase under constant agitation, using an enclosed turbine type high speed agitator. Pass the product through a colloid mill. The resulting product has approximately 9.8% pigment content and much higher resin content per pound of dry pigment than the products of Examples 16 to 19. Other pigments mentioned in this specification or other resins may be substituted for the ones used in this example.

*Example 21.—Schematic formula with various pigments.*—In this example, a number of pigments are shown in color concentrate formulations. All pigments have been first converted to a water dispersion by incorporating the following additives in the given proportions to their pigment-water mixtures, such as, for instance, to commercially available presscakes.

| Ingredient | Amount to be added |
|---|---|
| Duponol ME | 18.00% of Pigment Content. |
| Nekal A | 2.00% of Pigment Content. |
| Casein-Duponol Solution of Example 15. | 8.85% of Pigment Content. |
| 50% Methylcellulose 15 cps. Slurry in Mineral Spirits of Example 15. | 10.00% of Pigment Content. |
| 18% Casein Solution of Example 15. | 35.00 to 41.00% of Pigment Content. |
| Mineral Spirits | 20.00% of Pigment Content. |
| Antifoam | as required. |

In making resin emulsion color concentrates from these pigment slurries, additional emulsifying agent was added to the water phase in the proportion of about 6% on resin solids, using additional 15 cps. methylcellulose and casein as protective colloid additions. Pigment contents and resin contents of the color concentrates are given in the following table:

| Example No. | Pigment Content in 100 Parts of Color Concentrate, Parts | Resin Solids Content in 100 Parts of Color Concentrate, Parts |
|---|---|---|
| 21-A. Phthalocyanine Green | 15.6 | 10.2 |
| 21-B. Benzidine Yellow | 12.5 | 8.5 |
| 21-C. Thioindigo Brown | 8.6 | 10.4 |
| 21-D. Thioindigo Maroon | 11.8 | 8.5 |
| 21-E. Dianisidine Blue | 12.3 | 7.6 |
| 21-F. Iron Oxide Yellow (Artificial) | 20.8 | 10.4 |
| 21-G. Iron Oxide Brown (Artificial) | 20.8 | 10.4 |
| 21-H. Furnace Carbon Black | 10.4 | 10.5 |
| 21-I. Titanium Dioxide White | 38.7 | 12.5 |

The method used was the "oil phase-to-water phase" method. The surface active agents in these compositions range from 2.1% to 7%, the dry casein content from 1.2% to 2.7%, the dry methylcellulose content from 0.6% to 2.1%. All percentages are based on the total weight of the color concentrates.

In Examples 16 to 21 the expression "water phase" is understood to include the pigment slurry in water. In these examples the resin emulsion is prepared in situ in the presence of the pigment slurry. The pigment slurry is the water dispersion of the in-water deflocculated pigment.

Resins described and claimed in some of my prior patent applications have excellent resistance to alkali and soap. Films of oil modified alkyd resins, such as those containing phthalic anhydride, do not resist to alkali and soap and do not resist drycleaning solvents, such as perchlorethylene satisfactorily. I have found, that whereas pentaerythritol ester type alkyd resins, which contain polyunsaturated fatty acids, have somewhat improved resistance to alkali and soap, than the corresponding glycerin ester type resins, as such they still would not satisfy the requirements for binders of pigments for textile decoration purposes. However, if the pentaerythritol alkyd resins of this invention are used in conjunction with amino-aldehyde resins, their characteristics improve, when they are used in the manner herein described. Emulsion polymerization, as herein described, also improves chemical resistance of pentaerythritol alkyd resins.

The pigmented resin emulsion textile decorating colors of this invention, if formulated as herein described and claimed, will yield continuously or discontinuously decorated (colored) textile fabrics, which will withstand laundering in washing machines or by scrubbing on a washboard or hand rubbing, after they have been properly set. They will also withstand drycleaning under severe conditions of abrasion in commercial drycleaning processes with as strongly attacking drycleaning fluids as perchlorethylene. Proper setting of the colored decorated textiles, whether prepared by printing or pad dyeing, requires regular methods and equipment used in textile plants for the fixation of resin bonded pigment decorated textiles.

To fully understand the scope of the improvement of this invention I may refer to the known fact, that heavier film deposits show greater resistance to chemicals than thinner film deposits. For instance, when a certain clear varnish is applied by a film applicator on a glass plate or steel plate, which applicator deposits a 1½ mils wet film thickness and in another case the same varnish is deposited with a film applicator depositing 3 mils wet film thickness the alkali resistance against a 2% solution of sodium hydroxide may differ as much as 30 minutes for the thinner film deposit and 4 or 5 hours or more for the heavier film deposit. In textile printing, the thickness of the deposits is in the range of 1/10 of a mil and still the above described resistance is achieved.

I claim:

1. A pigmented oil-in-water type resin emulsion color concentrate for dyeing and printing textiles comprising, calculated on the total weight of the color concentrate, a pigment ranging in content from about 4.5% to about 40%, an emulsified binder resin ranging in content from about 6% to about 20.5%, a protective colloid ranging in content from about 1% to about 5.5%, and a combined content of pigment dispersing and emulsifying agent totalling from about 1.6% to about 7.5%, and water, said binder resin comprising a polyunsaturated fatty acid ester of a polyhydric alcohol, said ester being a pentaerythritol alkyd resin which contains (a) as polyhydric alcohol component, calculated on the total quantity of said polyhydric alcohol, about 50% to about 100% of a pentaerythritol, (b) an aromatic polybasic acid component, and (c) a polyunsaturated fatty acid component, wherein the latter acid component (c) does not amount to more than 65% of said alkyd resin and the smallest quantity of said latter acid is present after esterification in an amount of at least 50% of the total quantity of said alkyd resin, the aromatic polybasic acid component (b) of the alkyd resin comprising primarily a compound selected from the group consisting of phthalic acid and phthalic anhydride, wherein the emulsified binder resin also contains an aminoaldehyde resin, soluble in an organic solvent amounting to at least 5% and no more than 100% calculated on the amount of said alkyd resin present in the color concentrate, said emulsifying agent being selected from the class consisting of soaps of fatty acids, fatty acid esters of polyethylene glycols, quaternary ammonium salts, salts of long chain fatty amines, fatty alcohol sulfates, polyalkylene oxide condensation products, polymerized glycol esters, alkyl aryl polyether alcohols, alkyl aryl polyether sulfonates and salts of organic sulfonates, said protective colloid being selected from the class consisting of casein, ammonium caseinate, methylcellulose, sodium carboxymethylcellulose, gum tragacanth, dextrin, starch, polyacrylates, water-soluble and alkali-soluble hydroxyethylcellulose, locust bean gum, water-soluble salts of the maleic adduct of styrene, alginates, albumene, soya protein, ethyl-hydroxy-ethylcellulose, carboxymethyl-starch, hydroxy-propyl-starch ether and polyvinyl pyrolidone.

2. The composition of claim 1, in which the fatty acid component of the alkyd resin is soyabean oil fatty acids.

3. The composition of claim 1, in which the polycarboxylic acid component of the alkyd resin is phthalic anhydride.

4. The composition of claim 1, in which the aminoaldehyde resin is an organic solvent soluble melamine-formaldehyde resin.

5. The composition of claim 1, in which the aminoaldehyde resin is an organic solvent soluble urea-formaldehyde resin.

6. The composition of claim 1, containing in addition organic volatile hydrocarbon solvents in the dispersed phase of the emulsion.

7. The composition of claim 1, in which the emulsifying agent is a lauryl alcohol sulfate.

8. A color concentrate of claim 1, in which the binder resin is present in an emulsion polymerized state.

9. An oil-in-water resin emulsion textile printing color composition consisting of 1 part by volume of the color concentrate of claim 1 and from about 1 part to about 200 parts by volume of a clear extender print paste emulsion, said extender print paste emulsion comprising 47½% to 56% water, 0.3% to 0.8% of high viscosity water soluble cellulose ether and 43% to 51½% of a water immiscible hydrocarbon solvent, all percents being by weight.

10. A composition of matter according to claim 9, which contains a crock reducing additive, said additive being a compound selected from the group consisting of neoprene, a copolymer of butadiene and acrylonitrile, and mixtures thereof.

11. A pigmented oil-in-water type resin emulsion color concentrate for dyeing and printing textiles comprising, calculated on the total weight of the color concentrate, a pigment ranging in content from about 4.5% to about 40%, an emulsified binder resin ranging in content from about 6% to about 20.5%, a protective colloid ranging in content from about 1% to about 5.5%, and a combined content of pigment dispersing and emulsifying agent totalling from about 1.6% to about 7.5%, and water, said binder resin comprising a polyunsaturated fatty acid ester of a polyhydric alcohol, said ester being a pentaerythritol alkyd resin which contains (a) as polyhydric alcohol component, calculated on the total quantity of said polyhydric alcohol, about 50% to about 100% of a pentaerythritol, (b) an aromatic polybasic acid component, and (c) a polyunsaturated fatty acid component, wherein the latter acid component (c) does not amount to more than 65% of said alkyd resin and the smallest quantity of said latter acid is present after esterification in an amount of at least 50% of the total quantity of said alkyd resin, the aromatic polybasic acid component (b) of the alkyd resin comprising primarily a compound selected from the group consisting of phthalic acid and phthalic anhydride, said pigment consisting of a dispersed pigment deflocculated in water, the particles of which are surrounded by water, wherein the emulsified binder resin also contains an aminoaldehyde resin, soluble in an organic solvent amounting to at least 5% and no more than 100% calculated on the amount of said alkyd resin present in the color concentrate, said emulsifying agent being selected from the class consisting of soaps of fatty acids, fatty acid esters of polyethylene glycols, quaternary ammonium salts, salts of long chain fatty amines, fatty alcohol sulfates, polyalkylene oxide condensation products, polymerized glycol esters, alkyl aryl polyether alcohols, alkyl aryl polyether sulfonates and salts of organic sulfonates, said protective colloid being selected from the class consisting of casein, ammonium caseinate, methylcellulose, sodium carboxymethylcellulose, gum tragacanth, dextrin, starch, polyacrylates, water-soluble and alkali-soluble hydroxyethylcellulose, locust bean gum, water-soluble salts of the maleic adduct of styrene, alginates, albumene, soya protein, ethyl-hydroxy-ethylcellulose, carboxymethyl-starch, hydroxy-propyl-starch ether and polyvinyl pyrolidone.

12. A pigmented oil-in-water type resin emulsion color concentrate for dyeing and printing textiles comprising, calculated on the total weight of the color concentrate, a pigment ranging in content from about 4.5% to about 40%, an emulsified binder resin ranging in content from about 6% to about 20.5%, a protective colloid ranging in content from about 1% to about 5.5%, and a combined content of pigment dispersing and emulsifying agent totalling from about 1.6% to about 7.5%, and water, said binder resin comprising a polyunsaturated fatty acid ester of a polyhydric alcohol, said ester being a pentaerythritol alkyd resin which contains (a) as polyhydric alcohol component, calculated on the total quantity of said polyhydric alcohol, about 50% to about 100% of a pentaerythritol, (b) an aromatic polybasic acid component, and (c) a polyunsaturated fatty acid component, wherein the latter acid component (c) does not amount to more than 65% of said alkyd resin and the smallest quantity of said latter acid is present after esterification in an amount of at least 50% of the total quantity of said alkyd resin, the aromatic polybasic acid component (b) of the alkyd resin comprising primarily a compound selected from the group consisting of phthalic acid and phthalic anhydride, in which the pigment consists of a dispersed pigment deflocculated in water, the particles of which are surrounded by water, and wherein the color concentrate contains about 1% to about 40% of pigment-dispersing agent calculated on the content of the dry pigment, all percentages being based upon weight, wherein the emulsified binder resin also contains an aminoaldehyde resin, soluble in an organic solvent amounting to at least 5% and no more than 100% calculated on the amount of said alkyd resin present in the color concentrate, said emulsifying agent being selected from the class consisting of soaps of fatty acids, fatty acid esters of polyethylene glycols, quaternary ammonium salts, salts of long chain fatty amines, fatty alcohol sulfates, polyalkylene oxide condensation products, polymerized glycol esters, alkyl aryl polyether alcohols, alkyl aryl polyether sulfonates and salts of organic sulfonates, said protective colloid being selected from the class consisting of casein, ammonium caseinate, methylcellulose, sodium carboxymethylcellulose, gum tragacanth, dextrin, starch, polyacrylates, water-soluble and alkali-soluble hydroxyethylcellulose, locust bean gum, water-soluble salts of the maleic adduct of styrene, alginates, albumene, soya protein, ethyl-hydroxyl-ethylcellulose, carboxymethyl-starch, hydroxy-propyl - starch ether and polyvinyl pyrolidone.

13. A pigmented oil-in-water type resin emulsion color concentrate for dyeing and printing textiles comprising, calculated on the total weight of the color concentrate, a pigment ranging in content from about 4.5% to about 40%, an emulsified binder resin ranging in content from about 6% to about 20.5%, a protective colloid ranging in content from about 1% to about 5.5%, and a combined content of pigment dispersing and emulsifying agent totalling from about 1.6% to about 7.5%, and water, said binder resin comprising a polyunsaturated fatty acid ester of a polyhydric alcohol, said ester being a pentaerythritol alkyd resin which contains (a) as polyhydric alcohol component, calculated on the total quantity of said polyhydric alcohol, about 50% to about 100% of a pentaerythritol, (b) an aromatic polybasic acid component, and (c) a polyunsaturated fatty acid component, wherein the latter acid component (c) does not amount to more than 65% of said alkyd resin and the smallest quantity of said latter acid is present after esterification in an amount of at least 50% of the total quantity of said alkyd resin, the aromatic polybasic acid component (b) of the alkyd resin comprising primarily a compound selected from the group consisting of phthalic acid and phthalic anhydride, in which the pigment consists of a dispersed pigment deflocculated in water, the particles of which are surrounded by water, and wherein the color concentrate contains about 1% to about 40% of a fatty alcohol sulfate, wherein the emulsified binder resin also contains an aminoaldehyde resin, soluble in an organic solvent amounting to at least 5% and no more than 100% calculated on the amount of said alkyd resin present in the color concentrate, said emulsifying agent being selected from the class consisting of soaps of fatty acids, fatty acid esters of polyethylene glycols, quaternary ammonium salts, salts of long chain fatty amines, fatty alcohol sulfates, polyalkylene oxide condensation products, polymerized glycol esters, alkyl aryl polyether alcohols, alkyl aryl polyether sulfonates and salts of organic sulfonates, said protective colloid being selected from the class consisting of casein, ammonium caseinate, methylcellulose, sodium carboxymethylcellulose, gum tragacanth, dextrin, starch, polyacrylates, water-soluble and alkali-soluble hydroxyethylcellulose, locust bean gum, water-soluble salts of the maleic adduct of styrene, alginates, albumene, soya protein, ethyl-hydroxy-ethylcellulose, carboxymethyl - starch, hydroxy - propyl-starch ether and polyvinyl pyrolidone.

14. A pigment-free oil-in-water emulsion coating material in which the dispersed phase incorporates a polyhydric alcohol ester which is a pentaerythritol alkyd resin being in a solid state in the water emulsion, the vehicle solids of the emulsion being sensitive to the action of the air, when exposed to it in a thin layer of a wet film thickness of 0.0015" to 0.003", forming a coherent solid film immediately upon demulsification of the emulsion, said solid film formation being reached within a period ranging from a couple of seconds to one hour, the solid polyhydric alcohol esters forming the dispersed phase of the emulsion having an oxygen content which does not exceed the oxygen content of the unemulsified polyhydric alcohol esters by more than 2.8%, the vehicle solids dispersed phase content ranging from 10% to 70%, based on the total weight of water and vehicle solids constituents of the emulsion surface coating material, said emulsion surface coating material comprising further an emulsifying agent selected from the class consisting of soaps of fatty acids, fatty acid esters of polyethylene glycols, quaternary ammonium salts, salts of long chain fatty amines, fatty alcohol, sulfates, polyalkylene oxide condensation products, polymerized glycol esters, alkyl aryl polyether alcohols, alkyl aryl polyether sulfonates and salts of organic sulfonates in a proportion between about 0.2% and about 4.2% based on said oil-in-water emulsion, and a protective colloid selected from the class consisting of casein, ammonium caseinate, methylcellulose, sodium carboxymethylcellulose, gum tragacanth, dextrin, starch, polyacrylates, water-soluble and alkali-soluble hydroxyethylcellulose, locust bean gum, water-soluble salts of the maleic adduct of styrene, alginates, albumene, soya protein, ethyl-hydroxy - ethylcellulose, carboxymethyl-starch, hydroxy-propyl-starch ether and polyvinyl pyrolidone, in a proportion between about 0.25% and about 7% based on said oil-in-water emulsion, said pentaerythritol alkyd resin containing (a) as the polyhydric alcohol component 50 to 100% of a pentaerythritol, based on the total weight of said polyhydric alcohol, (b) an organic polycarboxylic acid component, and (c) a polyunsaturated fatty acid component which latter component is not more than 65% of said alkyd resin, the minimum quantity of said fatty acid being such as to yield when esterified at least 50% of the total weight quantity of said alkyd resin, the aromatic polybasic acid component (b) of the alkyd resin comprising primarily a compound selected from the group consisting of phthalic acid and phthalic anhydride, wherein the emulsified binder resin also contains an aminoaldehyde resin, soluble in an organic solvent amounting to at least 5% and no more than 100% calculated on the amount of said alkyd resin present in the color concentrate.

15. A pigmented oil-in-water type resin emulsion color concentrate for dyeing and printing textiles comprising two components, the first of said components being a preformed aqueous emulsion of a polyunsaturated fatty acid ester of a polyhydric alcohol which is a pentaerythritol alkyd resin as a resin binder, an emulsifying agent selected from the class consisting of soaps of fatty acids, fatty acid esters of polyethylene glycols, quaternary ammonium salts, salts of long chain fatty amines, fatty alcohol sulfates, polyalkylene oxide condensation products, polymerized glycol esters, alkyl aryl polyether alcohols, alkyl aryl polyether sulfonates and salts of organic sulfonates, and a protective colloid, selected from the class consisting of casein, ammonium caseinate, methylcellulose, sodium carboxymethylcellulose, gum tragacanth, dextrin, starch, polyacrylates, water-soluble and alkali-soluble hydroxyethylcellulose, locust bean gum, water-solube salts of the maleic adduct of styrene, alginates, albumene, soya protein, ethyl-hydroxy-ethylcellulose, carboxymethyl-starch, hydroxy-propyl-starch ether and polyvinyl pyrolidone, said emulsifying agent being present in a proportion between about 0.2% and about 4.2% based on the weight of the pre-formed aqueous emulsion and the protective colloid being present in a proportion between about 0.25% and about 7% based on the weight of the pre-formed aqueous emulsion, the second of said components being an aqueous pigment dispersion containing a pigment which is in a deflocculated state and which is a member of the class consisting of phthalocyanine pigments, insoluble azo pigments, vat pigments and carbon blacks, said color concentrate being viscous and dilutable with clear extender print paste emulsions to form the desired strength of shade when used for textile printing, said color concentrate having, based on the total weight of said color concentrate, between about 4.5% and about 31% of said resin binder derived from said first component, and between about 7% and about 22% of said pigment derived from said second component, said pentaerythritol alkyd resin containing (a) as the polyhydric alcohol component 50 to 100% of a pentaerythritol, based on the total of said polyhydric alcohol, (b) an aromatic polybasic acid component, and (c) a polyunsaturated fatty acid component which latter component is not more than 65% of said alkyd resin, the minimum quantity of said fatty acid being such as to yield when esterified at least 50% of the total quantity of said alkyd resin, the aromatic polybasic acid component (b) of the alkyd resin comprising primarily a compound selected from the group consisting of phthalic acid and phthalic anhydride, wherein the emulsified binder resin also contains an aminoaldehyde resin, soluble in an organic solvent amounting to at least 5% and no more than 100% calculated on the amount of said alkyd resin present in the color concentrate.

References Cited in the file of this patent

UNITED STATES PATENTS

| | | |
|---|---|---|
| 1,667,189 | Burke et al. | Apr. 24, 1928 |
| 2,315,708 | Hovey et al. | Apr. 6, 1943 |
| 2,440,953 | Iliff et al. | May 4, 1948 |
| 2,533,270 | Linkletter et al. | Dec. 12, 1950 |
| 2,681,322 | Auer | June 15, 1954 |
| 2,825,708 | Auer | Mar. 4, 1958 |